United States Patent [19]

Takeno

[11] Patent Number: 5,321,431
[45] Date of Patent: Jun. 14, 1994

[54] METHOD FOR PRINTING WITH SCANNED LIQUID CRYSTAL CELLS

[75] Inventor: Tuyoshi Takeno, Yamatokoriyama, Japan

[73] Assignee: Sharp Kabushiki Kaisha, Osaka, Japan

[21] Appl. No.: 799,370

[22] Filed: Nov. 27, 1991

[30] Foreign Application Priority Data

Nov. 29, 1990 [JP] Japan .................. 2-333727

[51] Int. Cl.⁵ .......................... B41J 2/435
[52] U.S. Cl. ..................... 346/108; 346/1.1
[58] Field of Search ............... 346/1.1, 76 L, 107 R, 346/108, 160

[56] References Cited

U.S. PATENT DOCUMENTS

| | | | |
|---|---|---|---|
| 4,952,034 | 8/1990 | Azusawa et al. | 359/54 |
| 5,031,122 | 7/1991 | Witty | 355/39 |
| 5,099,273 | 3/1992 | Yamamoto et al. | 355/27 |

FOREIGN PATENT DOCUMENTS 0010036 of 1974 Japan .
0010037 of 1974 Japan .
0030537 of 1984 Japan .
0020773 of 1989 Japan .
2226647 7/1990 United Kingdom .

*Primary Examiner*—Mark J. Reinhart
*Attorney, Agent, or Firm*—David G. Conlin; Donald Brown

[57] ABSTRACT

A method for forming an image in which image data defined of three original colors for forming a full color image is written in a mass of three kind of liquid crystal cells by beam light and the image is read by irradiating each liquid crystal cell with light corresponding to each of three original colors and printed out, the method including the steps of writing the image data into each liquid crystal cell by scanning beam light in a primary scanning direction and moving in a secondary scanning direction the three kind of liquid crystal cells arranged in the secondary scanning direction, and reading the image data by irradiating the liquid crystal cell with light of original colors while moving the mass of the liquid crystal cells in a direction opposite to that at the time of image writing.

2 Claims, 5 Drawing Sheets

METHOD FOR PRINTING WITH SCANNED LIQUID CRYSTAL CELLS

FIELD OF THE INVENTION

The present invention relates to a method for writing image data into an optical image memory by beam light, reading the written image and printing it out.

DESCRIPTION OF THE RELATED ART

U.S. Pat. No. 3,796,999 discloses a display in which laser beam or light selectively illuminates or irradiates a liquid crystal cell and the liquid crystal makes an image visible. In this display, heat of the laser light is utilized to partially vary a phase of the liquid crystal wherein the image is formed in accordance with an irradiation pattern of the laser light. The liquid crystal cell employed may be a smectic liquid crystal, for example.

Also, Japanese Unexamined Patent Publication No. 20773/1989 discloses a device using the above-mentioned thermal writing liquid crystal cells for forming an image. This art teaches: when light transmitted or reflected by the liquid crystal cell illuminates a photosensitive material, a latent image is formed on the photosensitive material; the latent image is utilized to make an image. Therein, three kind of liquid crystal cells, for example, images of primary colors, R (red), G (green) and B (blue), are written in the cells, and a full color image is synthesized of the three kind of images.

However, in such a conventional image formation device, since the liquid crystal cell is returned to an initial writing position (home position) every time the image is read from the liquid crystal cell, it takes a lot of time to complete an image formation work.

SUMMARY OF THE INVENTION

The present invention has been made to solve the above problems and it is an object of the present invention to provide a method for forming an image in which an image can be efficiently formed by improving the method for reading an image defined of a liquid crystal cell.

The present invention provides a method for forming an image in which image data of three original colors for forming a full color image is written in a mass of three kind of liquid crystal cells by beam light and the image is read by irradiating each liquid crystal cell with light corresponding to each of three original colors and printed out, which method comprises the steps of writing the image data to each liquid crystal cell by scanning beam light in a primary scanning direction and moving in a secondary scanning direction across the mass of the three liquid crystal cells arranged in the secondary scanning direction; and reading the image data by irradiating the liquid crystal cell with light of original colors while moving the liquid crystal cells in a direction opposite to that at the time of image writing.

In addition, the present invention provides a method for forming an image in which image data of three original colors for forming a full color image is written in three liquid crystal cells by beam light and the image is read by irradiating each liquid crystal cell with light corresponding to each of three original colors and printed out, which method comprises the steps of writing image data to each liquid crystal cell by scanning beam light in a primary scanning direction and moving in a secondary scanning direction the mass of the three liquid crystal cells arranged in the secondary scanning direction; and reading the image data of three original colors on going and returning paths of the liquid crystal cell by reciprocally moving the liquid crystal cell while irradiating the liquid crystal with each original color.

The liquid crystal cell may be any memory storing an image which is recognizable when it is irradiated with light and can be read even if the irradiation is repetitively performed (unless erasing is performed).

Preferably, the liquid crystal cell is composed of a liquid crystal cell using a liquid crystal showing a smectic C phase or a mixed liquid crystal of nematic and cholestric. Further preferable are those having, in the point of a structure of this liquid crystal, a structure disclosed in, for example, U.S. Pat. No. 3,796,999 in which a heat storage layer is laminated to the liquid crystal and a structure of a light writing type device disclosed in, for example, Japanese Unexamined Patent No. 10036/1974 or No. 10037/1974 in which a photoconductor layer is laminated are read. The liquid crystal cell may be a reflecting type cell or a transmitting type cell. The optical image memories are assumed to be able to store the image, if once stored, for few hours to several tens of days even if it is left intact or let alone.

As beam light used to write image data to the liquid crystal cell, laser beam from a laser diode or light from an LED is used, which irradiates an image region of the optical image memory by scanning or the whole surface irradiation in accordance with desired image data.

DETAILED DESCRIPTION OF THE PREFERRED EMBODIMENT

Figure 1:
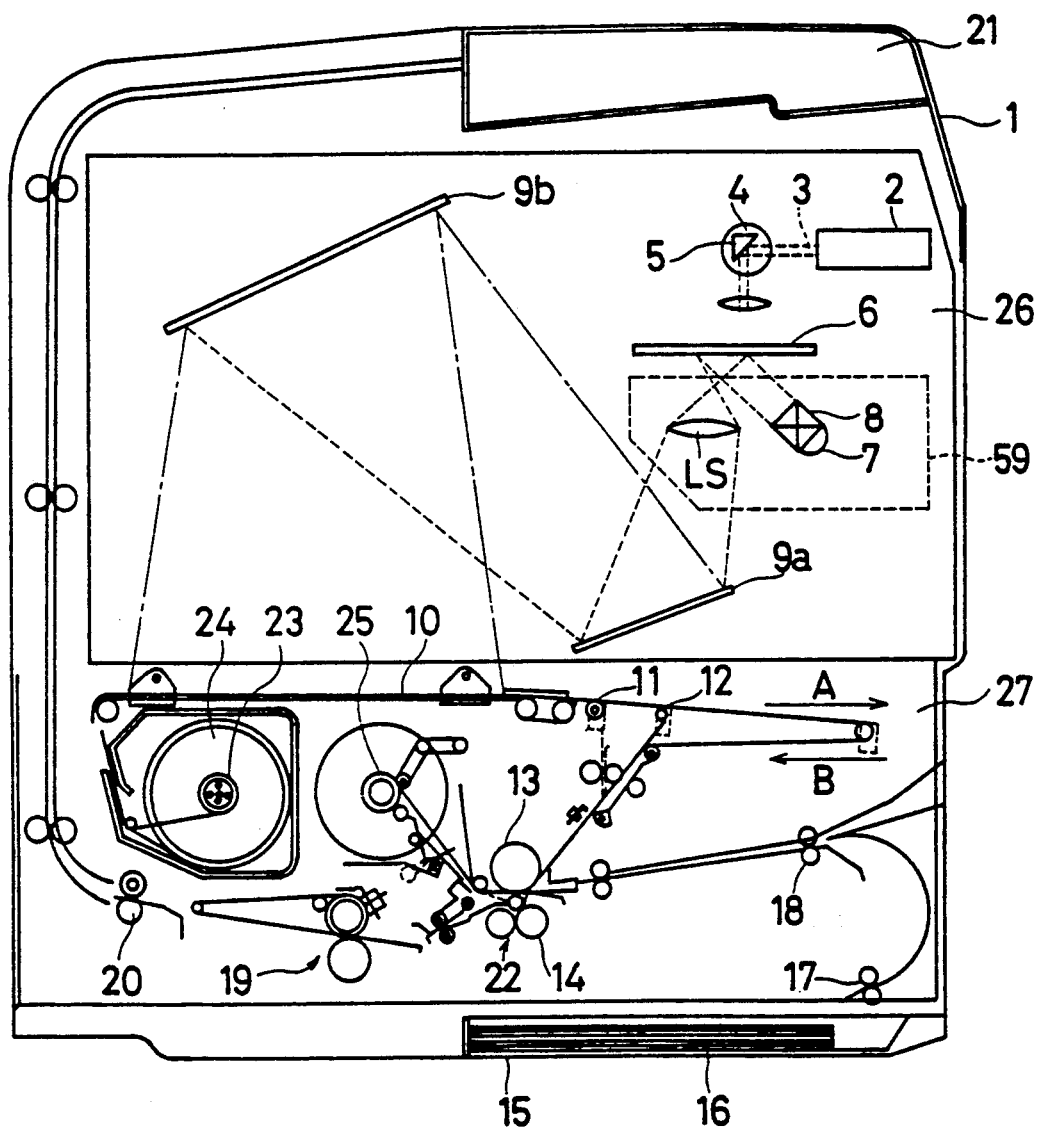
FIG. 1 is a view showing a structure of an image formation apparatus in accordance with an embodiment of the present invention.

FIG. 1 is a schematic view showing a structure of an image formation apparatus in accordance with an embodiment of the present invention. In the image formation apparatus, a photosensitive sheet (media sheet) coated with a microcapsules each containing an optical curing material and a dye and an image receiving sheet coated with a thermoplastic resin defining a developing material which forms a color in reaction to the dye are used.

The image formation apparatus is roughly composed of upper and lower parts; one is an image writing and exposure unit 26 and another is a developing unit 27. The image writing and exposure unit 26 comprises a laser diode 2 which outputs laser beam 3, a rotary encoder motor 4, a first scanning mirror 5, a liquid crystal cell unit 6, an exposure optical system 59 and a mirror 9a on the right side. The exposure optical system 59 comprises an exposure lamp (for example, halogen lamp) 7, a color filter unit 8 and a lens LS. In addition, a mirror 9b is arranged on the upper left side. The media sheet 24 on the left side in the developing unit 27 has been wound to a supplying shaft 23 and then it is carried through a carrying path and wound up to a winding shaft 25. There are arranged an exposing plate 10, an automatic feeding roller 11, a buffer roller 12 and pressuring rollers 13 and 14 along the carrying path of the media sheet 24 from the supplying shaft. On the lower right side, a cassette 15 is provided, in which an image receiving sheet 16 is housed. There are provided a supply roller 17, a timing roller 18 on a carrying path of the image receiving sheet 16 from the cassette 15 to a pressure developing unit 22. On the left of the pressure developing unit 22 provided is a lustering device 19, and on the left of it, a paper discharging roller 20 is placed. On top of a body 1, a paper discharging unit 21 is provided.

Figure 2:
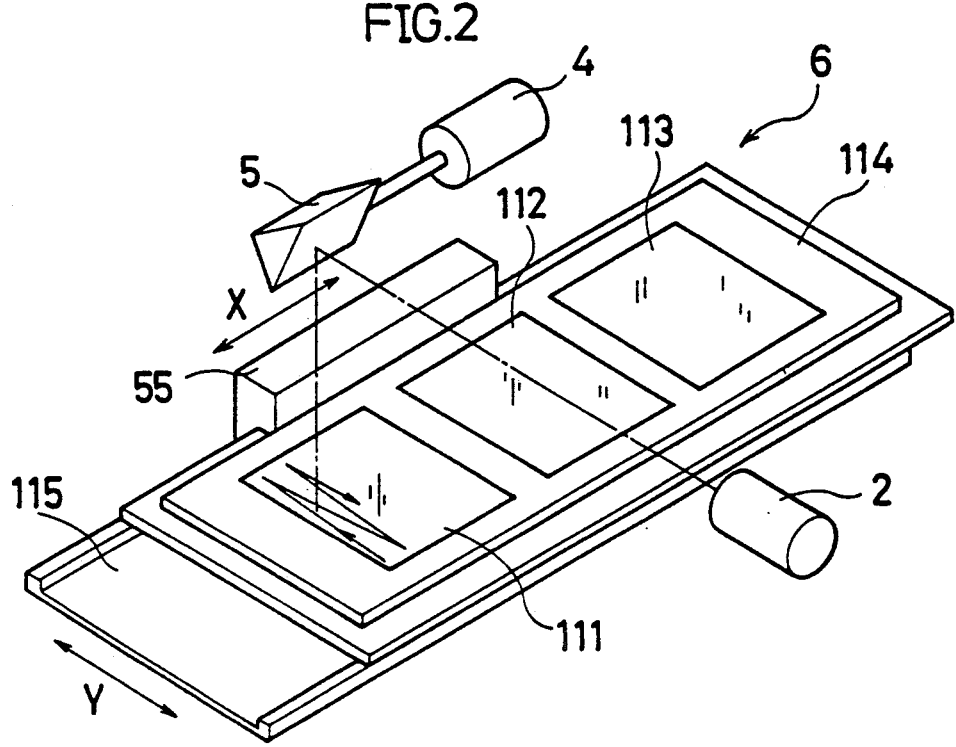
FIGS. 2 and 3 are each views showing a major portion of the structure of the embodiment shown in FIG. 1.
Figure 3:
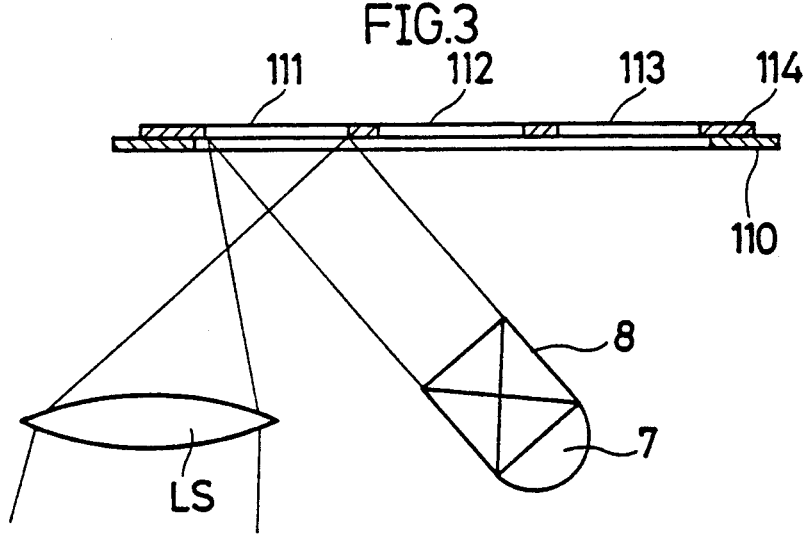

FIGS. 2 and 3 each show a major portion of FIG. 1. As shown in these figures, three liquid crystal cells, that is, a first cell 111, a second cell 112 and a third cell 113 of the liquid crystal cell unit 6 are fit in a frame 114, which is supported by a liquid crystal supporter 110. The liquid crystal supporter 110 is held by an X-axis direction moving mechanism 115 and can be moved in an X-axis direction (secondary scanning direction) shown by an arrow. The movement is accurately carried out by a linear encoder motor (a linear motor combined with a linear encoder) 55 (shown in FIG. 4). Above the liquid crystal supporter 110, a writing device including a laser diode 2, a primary scanning mirror 5 and a rotary encoder motor (a motor combined with a rotary encoder) 4 is placed. At the time of image writing, when the mirror 5 reciprocally pivots while the supporter 110 is moved in the X-axis direction, laser beam scans the liquid crystal cell in the Y-axis direction (primary scanning direction) as shown by an arrow drawn on the liquid crystal cell 111 in FIG. 2, so that the image is written.

The color filter unit 8 of the exposure optical system 59 comprises a color separating filter and a shutter (which are not shown). Each time the liquid crystal supporter 110 moves in the X-direction (shown in FIG. 2) and each of the liquid crystal cells reaches a specified position, the shutter of the color filter unit 8 opens and the liquid crystal cells 111 to 113 are planarly scanned, and reflected light from them is led through a lens LS to the exposure plate 10 to expose the media sheet 24 to light. In the liquid crystal cells 111 to 113, images of R (red), G (green) and B (blue) are written. The color separating filter of the color filter unit 8 selectively transmits light of specific colors; for example, there are three filter: a R filter transmitting wavelength of red, a G filter transmitting wavelength of green and a B filter transmitting wavelength of blue. The filter switches to the R filter transmitting the wavelength of red when the liquid crystal cell having a R image is read, to the G filter transmitting the wavelength of green when the liquid crystal cell having a G image is read, or to the B filter transmitting the wavelength of blue when the liquid crystal cell having a B image is read. The R, G and B filters are attached onto a disc rotated by a motor (not shown), and a specified filter can be positioned on an optical axis of the lamp 7 by a slit engraved on the disc. In addition, the shutter is also formed of a disc having an opening which is rotated by a motor (not shown), and the opening and closing of the shutter is detected through the slit engraved on the disc.

When red, green and blue light reflected from the liquid crystal cell unit 6 illuminates the media sheet 24 on the exposure plate 10 through the lens LS and mirrors 9a and 9b, the buffer roller 12 is moved in the direction shown by an arrow A. A selectively hardened image is formed on the media sheet 24 through exposure. The media sheet 24 may be a full color type photosensitive and pressure sensitive sheet disclosed in Japanese Unexamined Patent Publication No. 30537/1984, which is coated with three kind of micro capsules uniformly dispersed: (1) microcapsules loaded with a photo-hardening material sensitive to red light and dye developing cyanogen, (2) micro capsules loaded with a photo-hardening material sensitive to green light and dye developing Megenta and (3) micro capsules loaded with a photo-hardening material sensitive to blue light and dye developing yellow.

After exposure, the winding shaft 25 is rotated to move the buffer roller 12 in the direction shown by an arrow B and the media sheet 24 on which the selective hardened image is carried to the pressure developing part 22. On the other hand, the image receiving sheet 16 is supplied one by one from the cassette 15 and carried by the supplying roller 17 and then stops and waits at a timing roller 18. When the buffer roller 12 stars to move to the direction shown by the arrow B, the image receiving sheet 16 which was waiting is sent to the pressure developing unit 22 by the timing roller 18 in response to the image on the media sheet 24.

The media sheet 24 and the image receiving sheet 16 are pressed by the pressing rollers 13 and 14 with one of the sheets overlaid with the other. This causes microcapsules on the media sheet which are not hardened are crashed, and the dye in the capsules flows out and reacts to the developing material on the image receiving sheet to form a color. After the pressure development, the media sheet 24 is wound up to the winding shaft 25 and the image receiving sheet is subjected to a heat treatment at the lustering device 19 and then carried by the paper discharging roller 20 and discharged to the paper discharging part 21.

Figure 4:
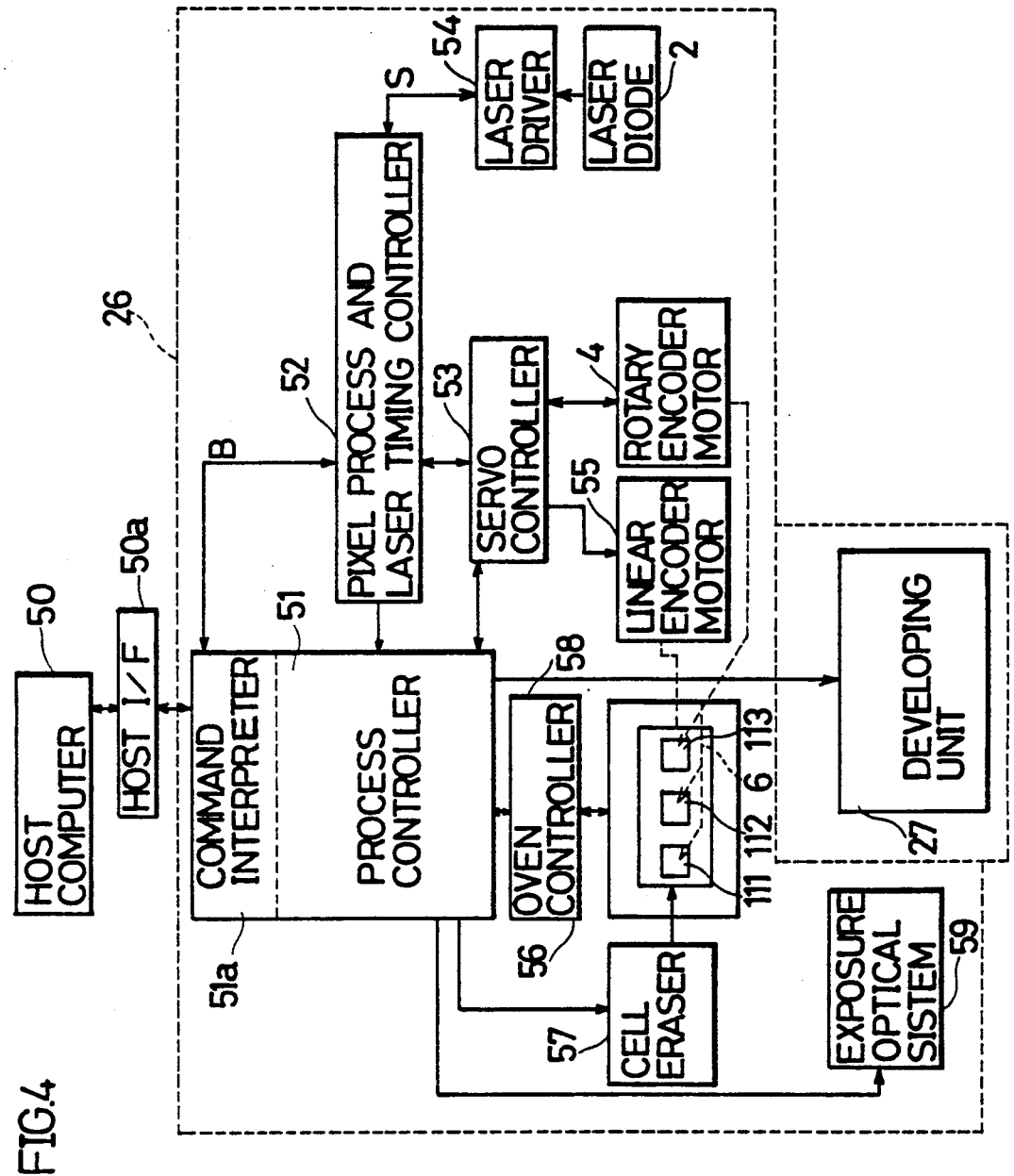
FIG. 4 is a block diagram showing a control part of the embodiment shown in FIG. 1.
Figure 5:
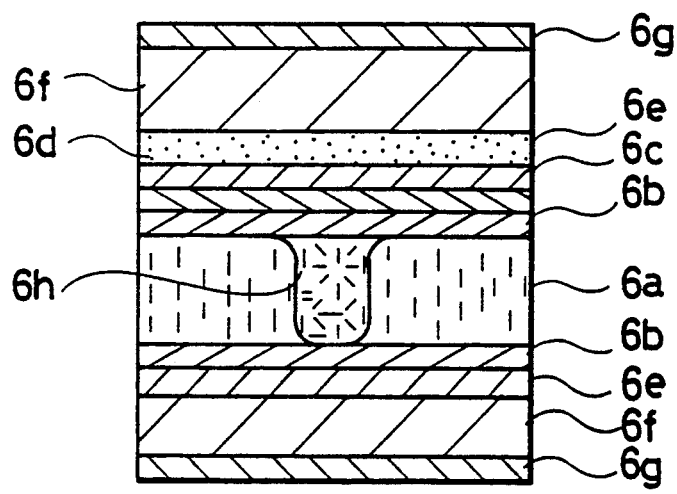
FIG. 5 is a view for explaining a major portion of a liquid crystal cell.

FIG. 4 is a block diagram showing a control circuit of the image writing and exposure unit 26, with which control operation of this embodiment of the present invention will be described.

After a command which is sent in advance of actual image data is analyzed at a command interpreter unit in a process controller 51, image data which is sent from a host computer 50 through a host interface 50a is sent to a pixel process and laser timing controller 52 through an inner pixel bus B on the basis of the above result. In the pixel process and laser timing controller 52, the image data is processed and laser-on-timing is adjusted. In processing the image data, the original image data sent from the host computer 50 is corrected in order to improve color repeatability, color matching, gradient and other image qualities of the printed image. This correction algorithm is determined so that a better image quality may be obtained with due regard to an influence exerted on each reproduced image quality by the media sheet 24, the developing unit 27 and the image writing and exposure unit 26. In adjusting the laser-on-timing, a laser drive signal S is provided to a laser driver 54 at an appropriate timing and at the laser-on-timing corresponding to the image data with regard to timing with a servo controller 53 to be described later and then a laser diode 2 emits light. The laser beam from the laser diode 2 is reflected by the primary scanning mirror 5 attached to a shaft of the rotary encoder motor 4 and illuminates the liquid crystal cell unit 6. The liquid crystal cell unit 6 is moved in the secondary scanning direction by the linear encoder motor 55 as described above.

The image is written on the cells 111 to 113 on the liquid crystal cell unit 6 by combining scanning in the primary scanning direction of the laser beam by the rotary encoder motor 4 with scanning in the secondary scanning direction by the linear encoder motor 55. Each of the rotary encoder motor 4 and the linear encoder motor 55 is monitored by a rotary encoder and a linear encoder, respectively which are combined in them and on the basis of this position information the servo controller 53 controls a drive necessary to write the image. In addition, the position information obtained from each encoder (of rotary and linear encoders) is also sent to the pixel process and laser timing controller 52 and used to control on-timing of the laser diode 2.

The image information written on the cells 111 to 113 is read by the exposure optical system 59 and the media sheet 24 is irradiated with light containing the image information. More specifically, the exposure optical system 59 receives a signal from the process controller 51 and then the liquid crystal cell unit 6 is irradiated with light from the exposure lamp 7 through the color filter unit 8 and its reflected light is led to the media sheet 24 through the lens LS.

The liquid crystal cell used in this embodiment of the present invention is a reflecting type cell written by laser heat. The liquid crystal cell used in a laser heat writing system is called a liquid crystal light bulb, in which a transparent electrode 6e is formed on the inner whole surface of two glass substrates 6f which sandwich a smectic liquid crystal layer 6e. An absorbing layer 6d for laser beam is formed on one substrate. When laser beam narrowed to approximately 10 microns illuminates the liquid crystal cell, the absorbing layer 6d absorbs the laser beam and generates heat. When the heat is transmitted to the liquid crystal layer 6a, only a part 6h irradiated with the laser beam changes from a smectic (S) phase to an isotropic liquid (I) phase through a nematic (N) phase. When the laser beam is moved to another place, a temperature abruptly drops and a light scattering orientation structure is formed in the process of changing as follows, that is, I phase→ N phase→ S phase. In addition, the liquid crystal cell is in the smectic phase at an operating temperature of the liquid crystal layer 6a and it is put in an oven 58 so that its phase may be changed to the isotropic liquid phase by energy of the laser beam, which oven is controlled by an oven controller 56 so that a temperature in it keeps at approximately 51° C. The liquid crystal which is not irradiated with the laser beam has a transparent orientation structure and once formed light scattering orientation structure stably exists with the transparent orientation structure. Thus, while a light scattering pixel is written in the liquid crystal layer by irradiation of laser beam, an image having gradation is written by scanning the liquid crystal cell while modulating a strength of the laser beam (modulating a pulse width of a pixel unit). When light is irradiated to the liquid crystal cell in which the image is written from an opposite side, the light transmits the liquid crystal layer 6a and is regularly reflected (mirror reflection) by the light reflective layer 6c at a part which is not irradiated with the laser beam, while the light scatters at a part which is irradiated with the laser beam. Thus, reflected light having a shaded image can be obtained from the liquid crystal cell unit 6. In addition, it is necessary to change all orientations to the transparent orientation in order to erase the image once written in the liquid crystal cell. The image is erased as follows. That is, the light scattering orientation structure written by a change of temperature caused by irradiation of the laser beam on the liquid crystal cell is oriented again when a high electric field above a certain threshold value is applied, and returns to the original transparent orientation structure. Thus, the light scattering image on the liquid crystal cell is all erased. According to this embodiment of the present invention, a rectangular wave voltage of approximately ±200V is applied to both ends of the transparent electrode 6e by a cell eraser 57, whereby a high electric field is generated on the liquid crystal layer and then the image is all erased. Thus, basic operation of wiring, reading, printing and erasing of the image can be performed as described above.

Figure 6:
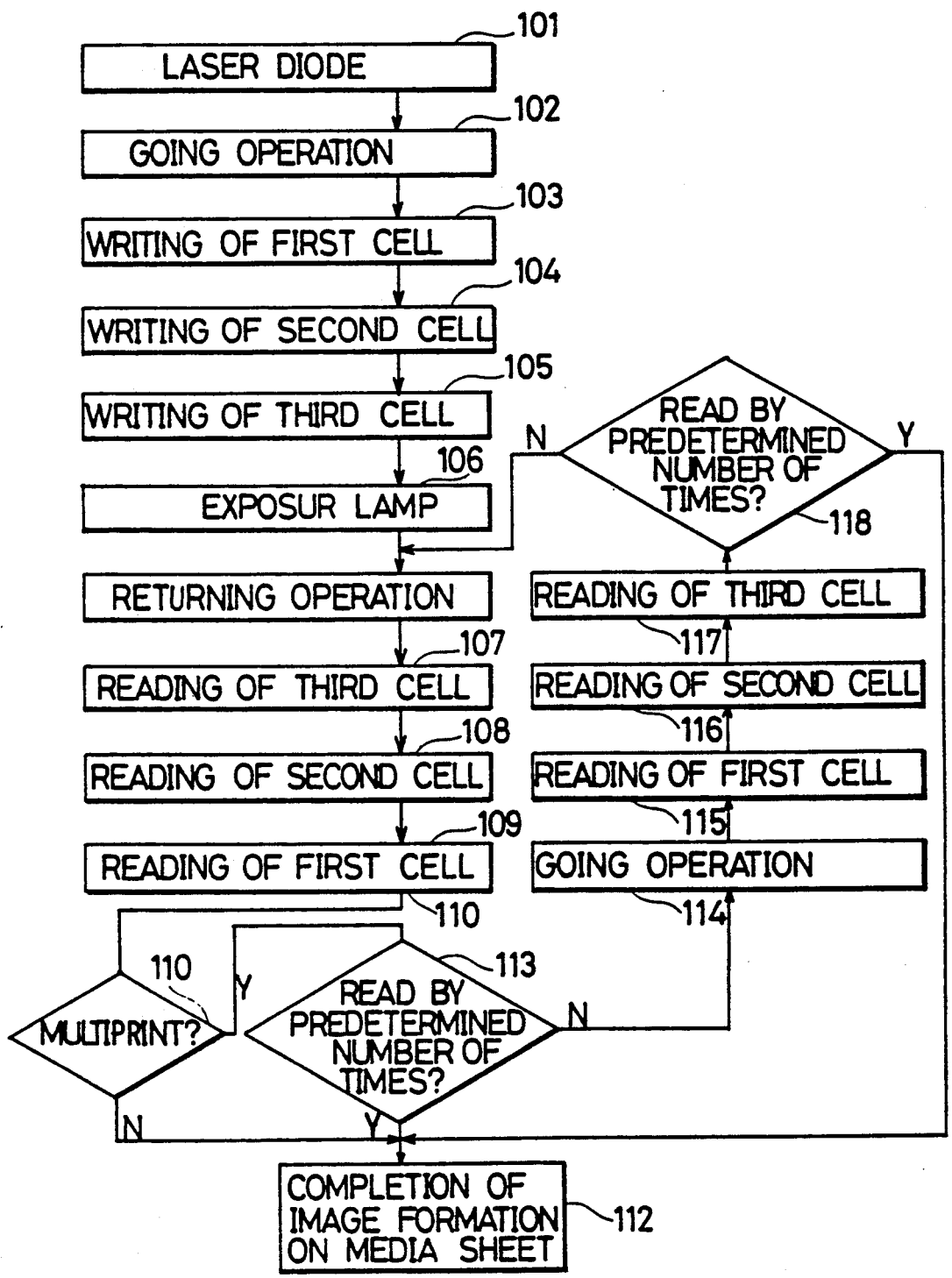
FIG. 6 is a flowchart for explaining operation of the embodiment shown in FIG. 1.

Next, single printing operation in which a sheet of image is printed out from a couple of full color image data and a multiple printing operation in which a plurality of sheets of image are printed out from a couple of full color image data will be described using a flowchart shown in FIG. 6.

First, in the single printing operation, as describe above, laser beam output from the laser diode 2 is reflected by a primary scanning mirror 5 attached to the rotary encoder motor 4 and illuminates the liquid crystal cell unit 6. Then, information of red, green, and blue is written in the first cell 111, the second cell 112 and the third cell 113 in the liquid crystal cell unit 6, respectively in this order through going operation of the linear encoder motor 55 (steps 101 to 105). Then, the third cell 113, the second cell 112 and the first cell 111 are irradiated with red, green and blue light obtained from an exposure lamp 7 through the color filter unit 8, respectively in this order from the opposite side of the liquid crystal cell unit 6 through returning operation of the linear encoder motor 55 (steps 106 to 110). Then, light reflected by the liquid crystal cell unit 6 is reflected by the mirrors 9a and 9b and illuminates the media sheet 24 on the exposure plate 10 (steps 111 and 112).

In the multiple printing operation, the liquid crystal cell unit 6 which was written once is used several times. As describe above, after information is written in the liquid crystal cell unit 6 by the going operation of the linear encoder motor 55 (steps 101 to 105), information of each color is read by irradiating the opposite side of the liquid crystal cell unit 6 with light. More specifically, at this time, while information of each color is read by irradiating the third cell 113 to the first cell 111 by the going operation of the linear encoder motor 55 with light, each cell is returned to an original position before writing (steps 106 to 110). Furthermore, information of each color is read once more by the going operation of the linear encoder motor 55 in order to move the written liquid crystal cells as it is in the order of the first cell 111, the second cell 112 and the third cell 113 (steps 113 to 117). Then, reading operation of the image is repeated by the going and returning operation of the linear encoder motor 55 until a predetermined number of sheets of image is printed out. Thus, it is not necessary to return the liquid crystal cell to the original position once again to read it. As a result, reading operation can be effectively performed and an image can be implemented at high speed.

According to the present invention, since image writing and reading operation can be continuously performed, image formation can be performed at high speed.

While only certain presently preferred embodiments have been described in detail, as will be apparent with those skilled in the art, certain changes and modifications can be made without departing from the scope of the invention as defined by the following claims.

What is claimed is:

1. A method for forming an image in which image data defined of three original colors for forming a full color image is written in a mass of three pieces of liquid crystal cells by beam light and the image is read by irradiating each liquid crystal cell with light corresponding to each of three original colors and printed out, said method comprising the steps of:

writing the image data into each liquid crystal cell by scanning beam light in a primary scanning direction and moving in a secondary scanning direction the three pieces of liquid crystal cells arranged in the secondary scanning direction: and reading the image data by irradiating the liquid crystal cell with light of original colors while moving the mass of the liquid crystal cells in a direction opposite to that at the time of image writing, when the step for writing the image data into the three pieces of liquid crystal cells is completed.

2. A method for forming an image in which image data defined of three original colors for forming a full color image is written in a mass of three pieces of liquid crystal cells by beam light and the image is read by irradiating each liquid crystal cell with light corresponding to each of three original colors and printed out, said method comprises the steps of:

writing the image data into each liquid crystal cell by scanning the beam light in a primary scanning direction and moving in a secondary scanning direction the three pieces of liquid crystal cells arranged direction the three pieces of liquid crystal cells arranged in the secondary scanning direction;

reading the image data of three original colors on going and returning paths of the liquid crystal cell by reciprocally moving the liquid crystal cell while irradiating the liquid crystal with each original color; and repeatedly printing out the full-color image on two media per reciprocal moving of the liquid crystal cell.

* * * * *